United States Patent
Park et al.

(10) Patent No.: US 7,065,139 B2
(45) Date of Patent: Jun. 20, 2006

(54) VIDEO ENCODING METHOD AND VIDEO ENCODER FOR IMPROVING PERFORMANCE

(75) Inventors: Hyun-sang Park, Cheonan (KR); Tae-hwan Park, Kyoungsan (KR)

(73) Assignee: Samsung Electronics Co., Ltd. (KR)

( * ) Notice: Subject to any disclaimer, the term of this patent is extended or adjusted under 35 U.S.C. 154(b) by 496 days.

(21) Appl. No.: 10/359,410

(22) Filed: Feb. 6, 2003

(65) Prior Publication Data

US 2003/0223498 A1     Dec. 4, 2003

(30) Foreign Application Priority Data

May 30, 2002   (KR) .............................. 2002-30291

(51) Int. Cl.
*H04B 1/66* (2006.01)
(52) U.S. Cl. .......................... 375/240.16; 375/240.13; 375/240.2; 375/240.03; 375/240.05; 375/240.25; 375/240.23; 375/240.24; 348/699; 382/236; 382/238; 382/251; 382/250; 382/246
(58) Field of Classification Search ........... 375/240.16, 375/240.12, 240.2, 240.03, 240.05, 240.23, 375/240.24, 240.25, 240.26, 240.13; 382/235, 382/236, 233, 250, 251, 238, 246; 348/699
See application file for complete search history.

(56) References Cited

U.S. PATENT DOCUMENTS

| 5,227,878 A | * | 7/1993 | Puri et al. ............... 375/240.15 |
| 5,638,126 A | * | 6/1997 | Lim ....................... 375/240.03 |
| 5,825,680 A | * | 10/1998 | Wheeler et al. ............ 708/650 |

* cited by examiner

*Primary Examiner*—Shawn S. An
(74) *Attorney, Agent, or Firm*—F. Chau & Associates LLC

(57) ABSTRACT

Video encoding methods and video encoders that provide improved performance while reducing power consumption. In one aspect, a video encoding method comprises the steps of outputting a parameter for a slice of a current frame, wherein the slice comprises a plurality of macroblocks, processing the slice by consecutively encoding and decoding each macroblock of the slice in response to the parameter, and outputting an interrupt signal for the slice The parameter preferably comprises an address of the first macroblock of the slice, an address of a search area in a previous frame, the search area corresponding to a current macroblock in a current frame, and a number of macroblocks comprising the slice.

16 Claims, 10 Drawing Sheets

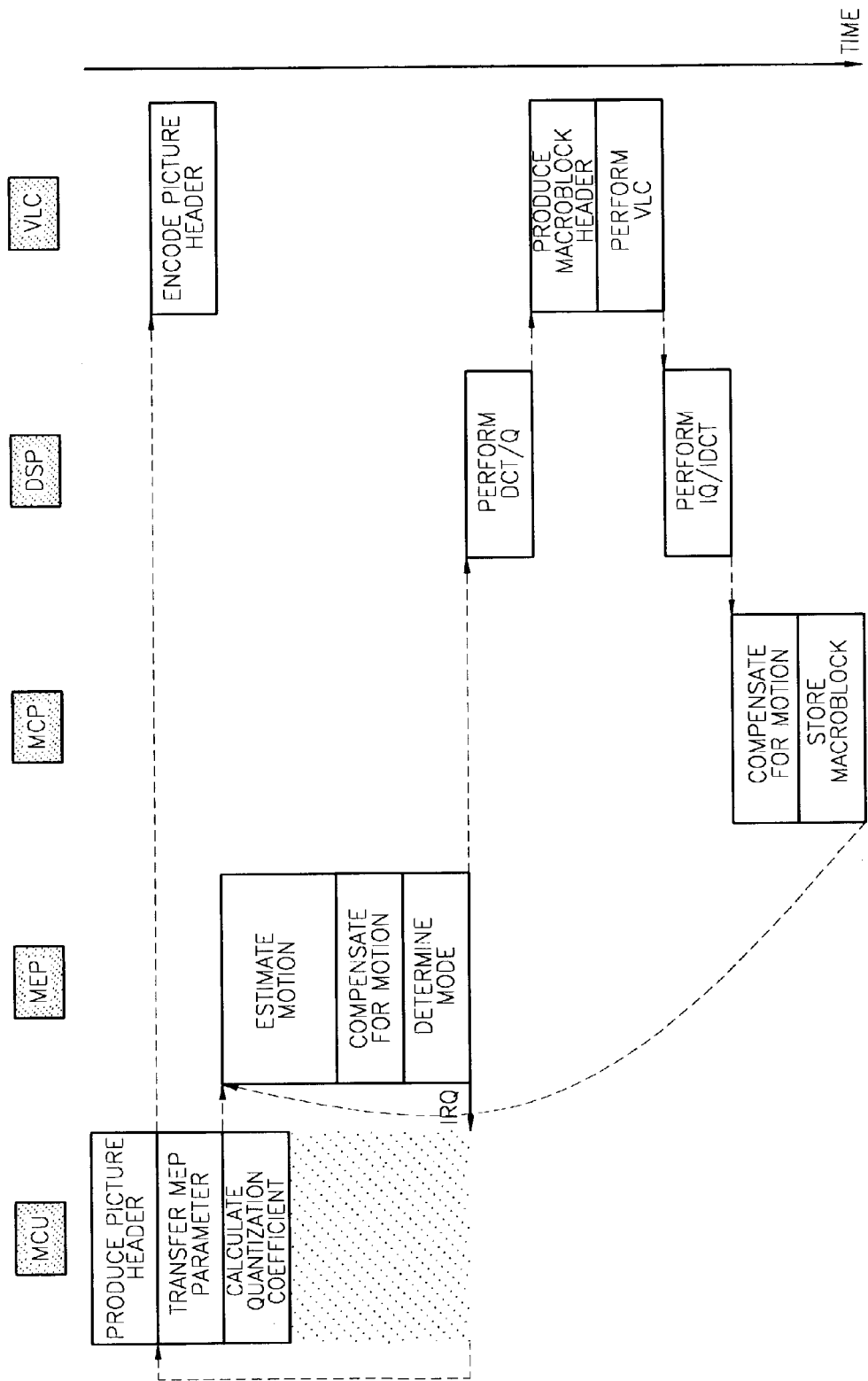

VIDEO ENCODING METHOD AND VIDEO ENCODER FOR IMPROVING PERFORMANCE

CROSS-REFERENCE TO RELATED APPLICATION

This application claims priority to Korean Application No. 2002-30291, filed on May 30, 2002, which is fully incorporated herein by reference.

TECHNICAL FIELD OF THE INVENTION

The present invention relates to video encoding methods and video encoders, and more particularly, to video encoding methods and video encoders for providing a system on chip (SOC) with improved performance by generating one interrupt signal per slice. Further, the present invention relates to a video encoding methods and video encoders that are used in international standards such as H.261, H.263 or Moving Picture Expert GROUP (MPEG).

BACKGROUND

FIG. 1 is a block diagram of a conventional video encoder. Referring to FIG. 1, a conventional video encoder 10 includes a main control unit (MCU) 20, a motion estimation processor (MEP) 30, a motion compensation processor (MCP) 40, an internal bus system 50, a memory 60, a memory controller 70, and a camera system 80.

The MEP 30 estimates the motion of a macroblock using the difference between a previous frame and a current frame. Based on the motion estimated by the MEP 30, the MCP 40 reads from the memory 60, 16×16 blocks that are the most perfectly matched with a current macroblock in the previous frame, that is, a motion-compensated macroblock.

The memory 60 is a data storage device, such as a synchronous dynamic random access memory (SDRAM), and stores previous and present frames. The memory controller 70 controls all of the operations of the memory 50, that is, reading of a previous frame, a current frame, or a motion-compensated macroblock from the memory 60 or writing of a previous frame, a current frame, or a restored image to the memory 60.

The camera system 80 captures an image and transfers the captured image to the memory 60. Each of the MCU 20, the MEP 30, the MCP 40, the memory controller 70, and the camera system 80 is connected to the internal bus system 50 and transceives predetermined data to/from the internal bus system 50.

FIG. 2 is a flowchart illustrating a conventional image encoding method that is performed by the video encoder of FIG. 1. Referring to FIGS. 1 and 2, when an image frame captured by the camera system 80 has been stored in the memory 60, the MCU 20 produces a picture header for the image frame to be encoded and encodes the image frame a macroblock at a time. Here, a macroblock is composed of 16×16 pixels. The picture header includes data regarding the image size, the image type (e.g., intra type (I) or predicted type (P)), and the like.

The MCU 20 transfers an MEP parameter via the internal bus system 50 to the MEP 30. The MEP parameter denotes information required to calculate a moving vector, and includes an address of a current macroblock in a current frame and an address of a search area in its previous frame, the search area corresponding to the current macroblock.

The MEP 30 receives the MEP parameter and estimates a motion vector. The MEP 30 can perform another operation, such as quantization coefficient calculation, while estimating a motion vector. The time for the MEP 30 to estimate a motion vector varies. Accordingly, when motion vector estimation is completed, the MEP 30 produces an interrupt signal IRQ and transfers the same to the MCU 20. The interrupt signal IRQ interrupts the operation of the MCU 20.

In response to the interrupt signal IRQ, the MCU 20 stops calculating a quantization coefficient and outputs an MCP parameter to the MCP 40. The MCP parameter includes the motion vector estimated by the MEP 30 and the start address of the search area on the previous frame.

The MCP 40 reads a motion-compensated macroblock from the memory 60 in response to the MCP parameter. When the data reading is completed, the MCP 40 outputs the interrupt signal IRQ to the MCU 20.

In response to the interrupt signal IRQ, the MCU 20 reads the motion-compensated macroblock from the MCP 40 and calculates a difference signal. The difference signal represents the difference between the current macroblock and the motion-compensated macroblock.

The MCU 20 determines whether to process the current macroblock in an intermode or in an intramode. If it is determined to process the current macroblock in an intermode, the MCU 20 performs discrete cosine transformation (DCT) and quantization (Q) with respect to the difference between the current macroblock and the motion-compensated macroblock.

On the other hand, if it is determined to process the current macroblock in an intramode, the MCU 20 performs discrete cosine transformation (DCT) and quantization (Q) with respect to the current macroblock.

After the discrete cosine transformation (DCT) and quantization (Q), the MCU 20 produces a header for the current macroblock and performs variable length encoding with respect to a quantized coefficient. When the variable length encoding is completed, the MCU 20 performs inverse quantization (IQ) and inverse discrete cosine transformation (IDCT) with respect to the quantized coefficient.

If the current macroblock is in an intramode, the MCU 20 transfers the image restored or decoded by IQ and IDCT to the memory 60.

However, if the current macroblock is in an intermode, the MCU 20 transfers the motion vector estimated by the MEP 30 and the start address of the search area on the previous frame to the MCP 40. In response to the motion vector estimated by the MEP 30 and the start address of the search area on the previous frame, the MCP 40 reads a motion-compensated image from the memory 60 and an interrupt signal IRQ to the MCU 20.

In response to the interrupt signal IRQ, the MCU 20 adds the motion-compensated image stored in the MCP 40 to a dequantized image to produce a restored or decoded image, and stores the restored image in the memory 60. If encoding and decoding with respect to one macroblock are completed through the above-described process, the conventional video encoder 10 encodes and decodes the next macroblock.

The conventional video encoder 10 generates an interrupt signal IRQ three times to encode and decode one macroblock. Accordingly, in order to process 30 352×288 images per second, the conventional video encoder 10 generates an interrupt signal IRQ 35640 times (35640=352×288×3×30/ 16×16). Since the conventional video encoder 10 performs other operations during image encoding, frequent generation of the interrupt signal IRQ degrades the performance of the video encoder.

Since the MCU 20 requires tens to hundreds of cycles to process one interrupt signal IRQ, the operations of the MCU 20 other than image encoding are significantly hindered by the IRQ signal. When the MCU 20 performs DCT and Q, a significant amount of power is consumed.

SUMMARY OF THE INVENTION

To solve the above-described problems, it is an object of the present invention to provide video encoding methods and video encoders that are capable of improving performance while significantly reducing the frequency at which internal IRQ signals are generated.

Another object of the present invention is to provide video encoding methods and video encoders that are capable of reducing power consumption.

In one embodiment of the invention, a method for encoding a video comprises outputting a parameter for a slice of a current frame, wherein the slice comprises a plurality of macroblocks, and processing the slice by consecutively encoding and decoding each macroblock of the slice in response to the parameter. When the encoding and decoding for the slice is completed, an interrupt signal is output. The interrupt signal indicates a point in time when the encoding and decoding of each macroblock of the slice has been completed.

The parameter preferably comprises an address of the first macroblock of the slice, an address of a search area in a previous frame, the search area corresponding to a current macroblock in a current frame, and a number of macroblocks comprising the slice.

In another embodiment of the invention, the step of processing the slice comprises the following steps. First, a motion vector is estimated in response to the parameter. Thereafter, it is determined whether a current macroblock of the slice is to be processed in an intermode or intramode. Data required for discrete cosine transform (DCT) and quantization is produced depending on a determined mode, and the produced data is DCT transformed and quantized to obtain a quantized coefficient. Variable length coding (VLC) is performed on the quantized coefficient. Inverse DCT (IDCT) and inverse quantization (IQ) are performed on the quantized coefficient, and the current macroblock is decoded in the determined mode.

In another embodiment of the invention, the step of processing the slice comprises the following steps. First, a motion vector is estimated in response to the parameter. Then, it is determined whether the macroblocks of the slice are to be processed in an intermode or intramode. If it is determined that the macroblocks are to be processed in an intermode, a difference between the macroblocks and motion-compensated macroblocks is calculated and DCT-transformed and quantized. A quantized coefficient is obtained and a coded block pattern is produced based on the quantized coefficient. On the other hand, if it is determined that the macroblocks are to be processed in an intramode, the macroblocks are DCT transformed and quantized. A quantized coefficient is obtained and a coded block pattern is produced based on the quantized coefficient. The headers for the macroblocks are produced in response to the determined mode, the coded block pattern, and the quantized coefficient, and the quantized coefficient is VLC coded. The quantized coefficient is IDCT transformed and IQ quantized. The macroblocks are decoded in the determined mode.

In another embodiment of the invention, a video encoder comprises a main control unit for outputting a parameter for a slice of a current frame, wherein the slice comprise a plurality of macroblocks, and a motion estimator for consecutively encoding and decoding each macroblock of the slice in response to the parameter and outputting an interrupt signal to the main control unit when the encoding and decoding for the slice is complete.

The parameter preferably comprises an address of a first macroblock of the slice, an address of a search area in a previous frame, the search area corresponding to a current macroblock in a current frame, and a number of macroblocks comprising the slice.

In another embodiment of the invention, the motion estimator estimates a motion vector in response to the parameter, determines whether a current macroblock is to be processed in an intermode or intramode, produces data required for DCT and quantization depending on a determined mode, DCT transforms and quantizes the produced data, and outputs a quantized coefficient. The video encoder further comprises a variable length coder which receives and VLC-codes the quantized coefficient. When the VLC coding is completed, the motion estimator IDCT transforms and IQ quantizes the quantized coefficient and decodes the current macroblock in the determined mode.

In another embodiment of the invention, the motion estimator estimates a motion vector in response to the parameter and determines whether the macroblocks of the slice are to be processed in an intermode or intramode. If it is determined that the macroblocks are to be processed in an intermode, the difference between the macroblocks and motion-compensated macroblocks is calculated, DCT transformed and quantized. A quantized coefficient is obtained and a coded block pattern is produced based on the quantized coefficient. On the other hand, if it is determined that the macroblocks are to be processed in an intramode, the macroblocks are DCT transformed and quantized. A quantized coefficient is obtained and a coded block pattern is produced based on the quantized coefficient. The video encoder further comprises a variable length coder that produces the headers for the macroblocks in response to the determined mode, the coded block pattern, and a difference between the macroblock and a motion-compensated macroblock and VLC codes the quantized coefficient. When the VLC coding is completed, the motion estimator IDCT transforms and IQ quantizes the quantized coefficient and decodes the macroblocks in the determined mode.

BRIEF DESCRIPTION OF THE DRAWINGS

The above objects and advantages of the present invention will become more apparent by describing in detail preferred embodiments thereof with reference to the attached drawings in which:

FIG. 10 is a flowchart illustrating an image encoding method according to another aspect of the invention, which is preferably performed in the video encoder of FIG. 9.

DETAILED DESCRIPTION OF PREFERRED EMBODIMENTS

The present invention will now be described more fully hereinafter with reference to the accompanying drawings, in which preferred embodiments of the invention are shown, wherein the same reference numbers denote the same or similar elements.

Figure 1:
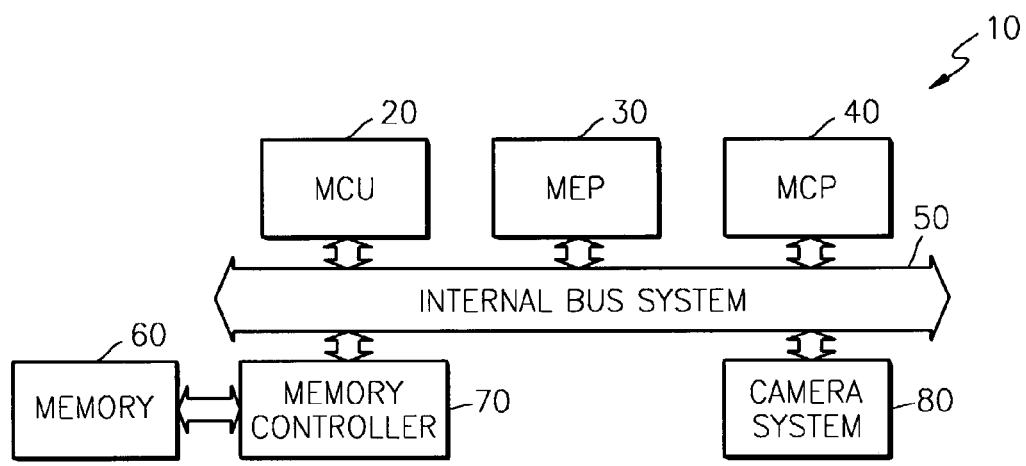
FIG. 1 is a block diagram of a conventional video encoder.
Figure 2:
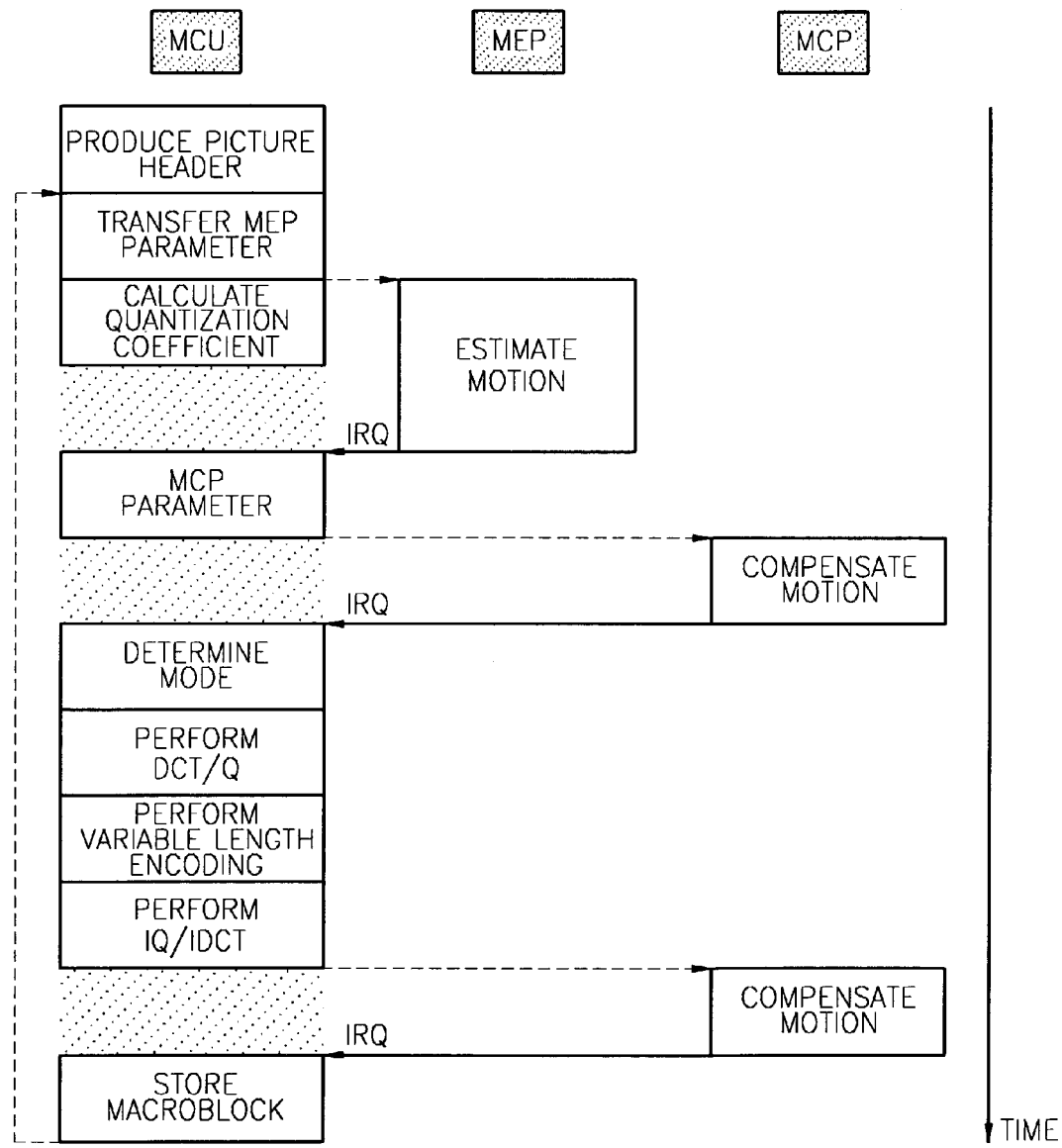
FIG. 2 is a flowchart illustrating a conventional image encoding method performed in the video encoder of FIG. 1.
Figure 3:
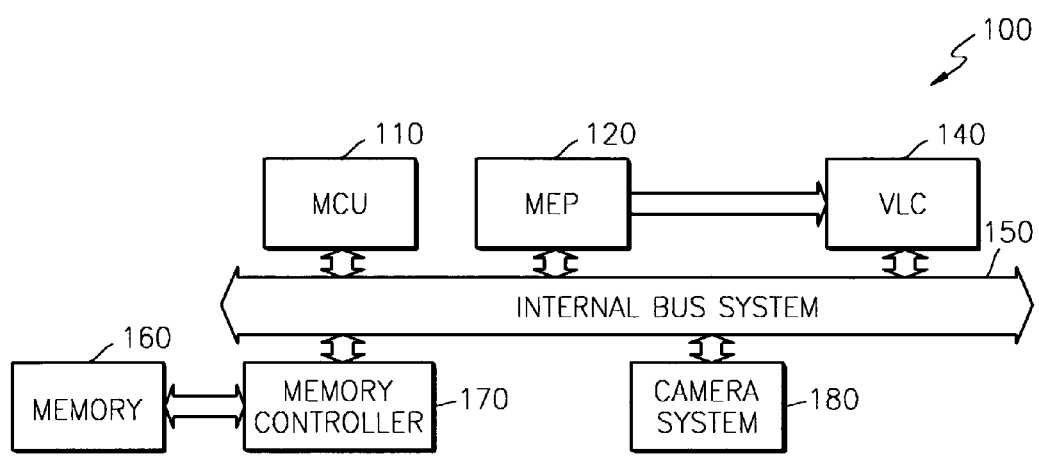
FIG. 3 is a block diagram of a video encoder according to an embodiment of the present invention.

Referring to FIG. 3, a video encoder 100 according to an embodiment of the present invention comprises a main control unit (MCU) 110, a motion estimation processor (MEP) 120, a variable length coder (VLC) 140, an internal bus system 150, a memory 160, a memory controller 170, and a camera system 180. The video encoder 100 can be implemented on a semiconductor chip.

Figure 4:
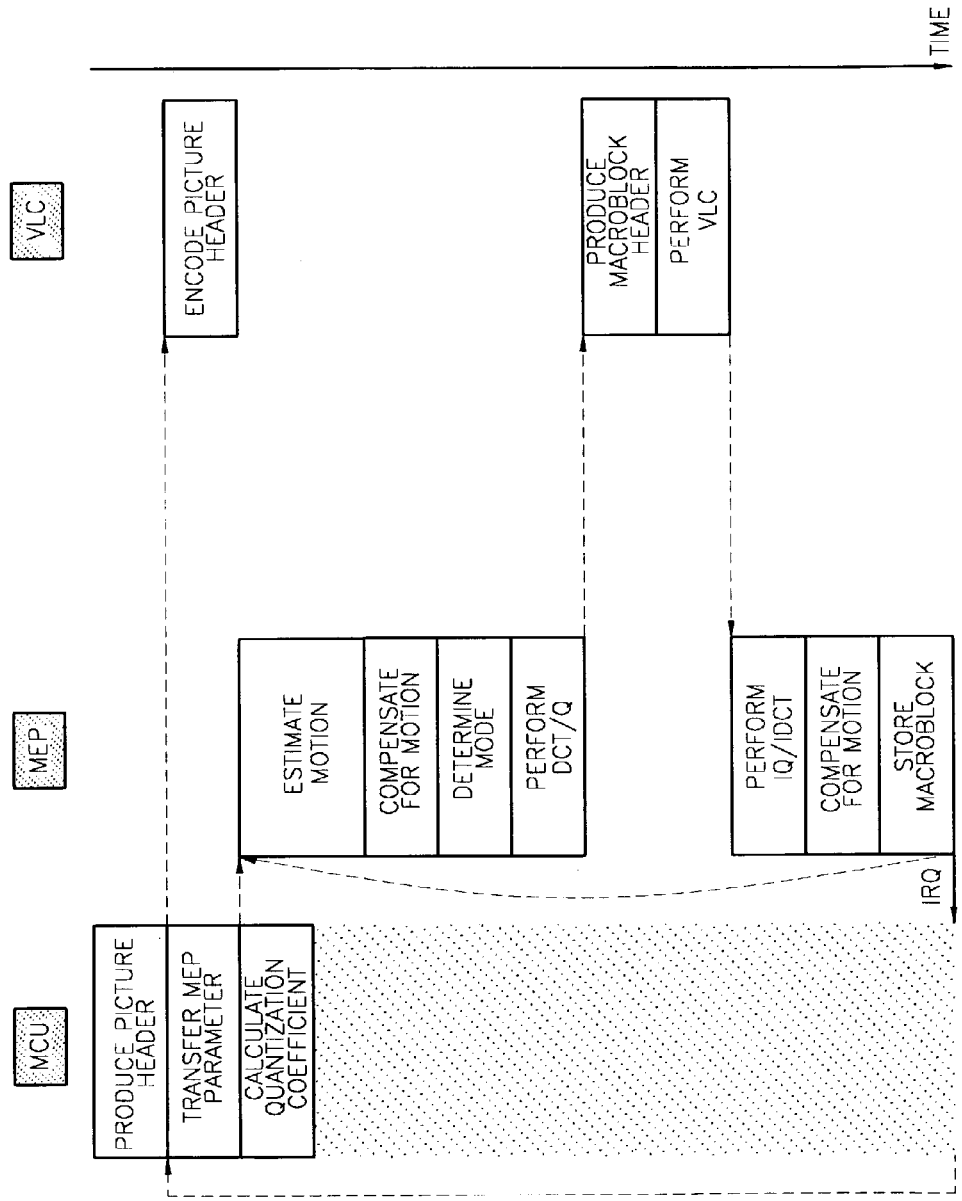
FIG. 4 is a flowchart illustrating an image encoding method according to one aspect of the invention, which is preferably performed in the video encoder of FIG. 3.

FIG. 4 is a flowchart illustrating a video encoding method according to one aspect of the invention, which is preferably performed in the video encoder 100 of FIG. 3. Referring to FIGS. 3 and 4, process steps of a mode of operation of the video encoder 100 will be described in chronological order. To begin, the camera system 180 captures a video or image frame and outputs the captured video or image frame via the internal bus system 150 to the memory 160. The memory 160 receives and stores the video or image frame output from the camera system 180.

The MCU 110 starts encoding while producing a picture header for the video or image frame to be encoded. The MCU 110 transfers the picture header to the VLC 140. The VLC 140 performs variable length coding (VLC) on the picture header and outputs the result to the memory 160.

The MCU 110 divides the video or image frame to be encoded into slices, divides each of the slices into macroblocks, and performs encoding while dividing each of the macroblocks into blocks.

The MCU 110 transfers an MEP parameter to the MEP 120. The MEP parameter denotes data required for the MEP 120 to calculate a motion vector. The MEP parameter includes an address of the first macroblock of a slice, an address of a search area in a previous frame, the search area corresponding to the current macroblock of the current frame, and a number of macroblocks constituting a slice.

After transferring the MEP parameter to the MEP 120, the MCU 110 performs several operations including quantization coefficient calculation until a slice is encoded and decoded.

The MEP 120 estimates a motion vector in response to the MEP parameter and determines whether a current macroblock is to be processed in an intermode or an intramode.

The MEP 120 prepares data required for discrete cosine transformation (DCT) and quantization depending on a determined mode. If the current macroblock is processed in an intermode, the MEP 120 calculates the difference between the current macroblock and a motion-compensated macroblock, DCT transforms and quantizes the difference, and outputs a quantized DCT coefficient to the VLC 140. The MEP 120 also produces a coded block pattern (CBP) based on the quantized DCT coefficient and outputs the CBP to the VLC 140.

The MEP 120 can calculate the difference between the motion vector of the current macroblock and a predicted motion vector by a motion vector prediction method used in international standards such as H.263 or MPEG4 (Moving Picture Expert Group 4).

On the other hand, if the current macroblock is processed in an intramode, the MEP 120 DCT transforms and quantizes the current macroblock and outputs a quantized DCT coefficient to the VLC 140.

The VLC 140 receives the mode data (whether intramode or intermode), the CBP, and the quantized DCT coefficient from the MEP 120, produces a macroblock header using the received data, and outputs the macroblock header to the memory 160. The VLC 140 also VLC-encodes the quantized DCT coefficient and outputs the encoding result to the memory 160.

After VLC encoding on the quantized DCT coefficient is completed, the MEP 120 performs inverse quantization (IQ) and inverse DCT (IDCT) on the quantized DCT coefficient. In an intramode, the MEP 120 outputs the decoded original macroblock to the memory 160 without any intervening process. However, in an intermode, the MEP 120 obtains the decoded original macroblock by adding the motion-compensated macroblock to the IQ-quantized macroblock and outputs the decoded original macroblock to the memory 160.

As described above, when encoding and decoding for one macroblock in a slice is completed, its adjacent macroblock within the same slice is subsequently encoded and decoded.

Thereafter, the MEP 120 generates an interrupt signal IRQ, which indicates the point in time when encoding and decoding for a slice has been completed, and outputs the same to the MCU 110. The MCU 110 transfers an MEP parameter to the MEP 120 in response to the interrupt signal IRQ. The following encoding and decoding process is the same as described above.

The video encoder 100 according to the present invention generates an interrupt signal IRQ once for each slice. Consequently, in order to process 30 frames (each frame is 352×288 pixels) per second, the video encoder 100 generates the interrupt signal IRQ 540 times (540=288×30/16) per second.

Accordingly, the frequency of IRQ generations by the video encoder 100 according to the present invention is reduced to a maximum of one sixty-sixth (1/66) of the frequency of IRQ generations by the conventional video encoder 10. Therefore, the burden upon the MCU 110 to process the interrupt signal IRQ is reduced, leading to an improvement in the entire system of the video encoder 100.

Figure 5:
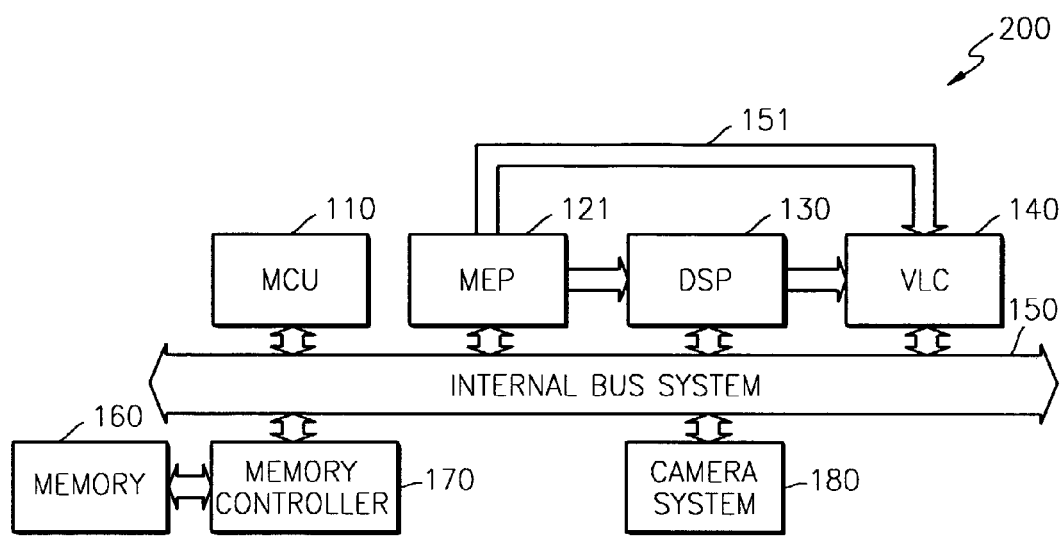
FIG. 5 is a block diagram of a video encoder according to another embodiment of the present invention.

FIG. 5 is a block diagram of a video encoder 200 according to another embodiment of the present invention. The video encoder 200 comprises an MCU 110, an MEP 121, a digital signal processor 130, a VLC 140, an internal bus system 150, a memory 160, a memory controller 170, and a camera system 180. In addition, the MEP 121 is directly connected to the VLC 140 by a dedicated bus 151. Each of the VLC 140, the memory 160, the memory controller 170, and the camera system 180 is connected to the internal bus system 150 and transceives predetermined data.

Figure 6:
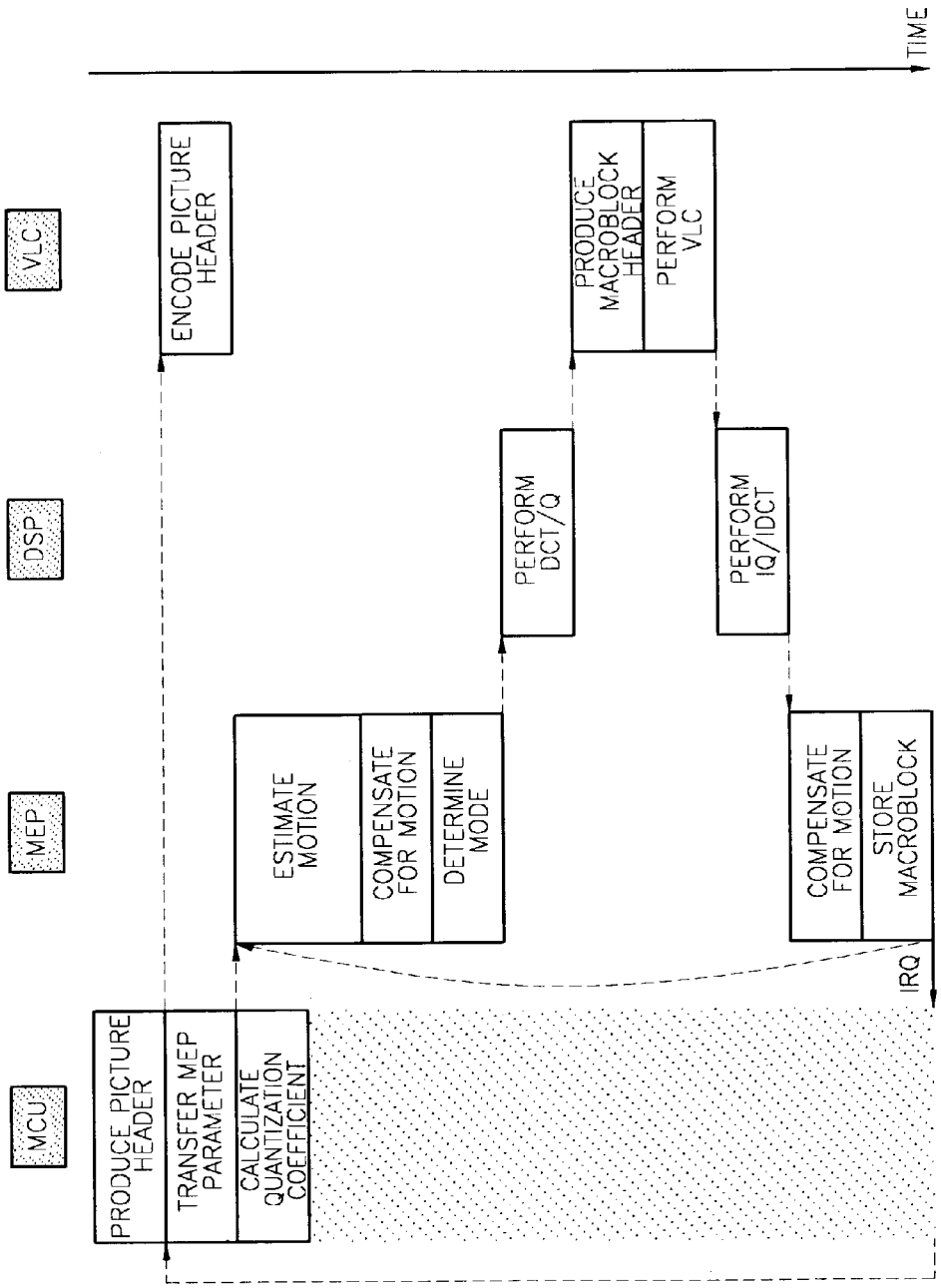
FIG. 6 is a flowchart illustrating an image encoding method according to another aspect of the invention, which is preferably performed in the video encoder of FIG. 5.

FIG. 6 is a flowchart illustrating an image encoding method according to another aspect of the invention, which is preferably performed in the video encoder 200 of FIG. 5. The operation of the video encoder 200 is similar to the operation of the video encoder 100.

Referring to FIGS. 5 and 6, process steps of a mode of operation of the video encoder 200 will be described in chronological order. To begin, when a video frame to be encoded is prepared, the MCU 110 starts encoding while producing a picture header for the video frame. The MCU 110 transfers the picture header to the VLC 140.

The VLC 140 VLC encodes the received picture header and outputs the result to the memory 160. The memory 160 receives and stores the output signal of the VLC 140.

The MCU 110 transfers an MEP parameter to the MEP 121. The MEP parameter includes an address of the first macroblock of a slice, an address of a search area in a previous frame, the search area corresponding to the current macroblock of a current frame, and a number of macroblocks constituting a slice.

After transferring the MEP parameter to the MEP 121, the MCU 110 performs several operations including quantization coefficient calculation until a slice is encoded and decoded.

The MEP 121 estimates a motion vector in response to the MEP parameter and determines whether a current macroblock is to be processed in an intermode or an intramode.

The MEP 121 prepares data required for discrete cosine transformation (DCT) and quantization depending on a determined mode. If the current macroblock is processed in an intermode, the MEP 121 calculates the difference between the current macroblock and a motion-compensated macroblock and outputs the same to the DSP 130.

The MEP 121 can calculate the difference between the motion vector of the current macroblock and a predicted motion vector by a motion vector prediction method used in international standards such as H.263 or MPEG4.

On the other hand, if the current macroblock is processed in an intramode, the MEP 121 outputs the current macroblock to the DSP 130.

The MEP 121 outputs the data regarding the determined mode and the difference between the motion vector of the current macroblock and a predicted motion vector directly to the VLC 140 via bus 151. Here, the data regarding the determined mode is referred to as mode data.

The DSP 130 receives the current macroblock or the difference between the current macroblock and a motion-compensated macroblock, DCT-transforms and quantizes them, and outputs a quantized DCT coefficient to the VLC 140. The DSP 130 also produces a CBP based on the produced quantized DCT coefficient and outputs the same to the VLC 140.

The VLC 140 receives the mode data, the CBP, and the quantized DCT coefficient from the MEP 121, produces a macroblock header using the received data, and outputs the macroblock header to the memory 160. The VLC 140 also VLC-encodes the quantized DCT coefficient and outputs the encoding result to the memory 160.

After VLC encoding of the quantized DCT coefficient is completed, the DSP 130 performs IQ and IDCT on the quantized DCT coefficient. In an intramode, the MEP 121 outputs the decoded original macroblock to the memory 160 without any intervening process. However, in an intermode, the MEP 121 obtains the decoded original macroblock by adding the motion-compensated macroblock to the IQ-quantized macroblock and then outputs the decoded original macroblock to the memory 160.

As described above, if encoding and decoding for one macroblock in a slice is completed, its adjacent macroblock within the same slice is subsequently encoded and decoded. Thereafter, the MEP 121 generates an interrupt signal IRQ, which indicates the point in time when encoding and decoding for a slice has been completed, and outputs the same to the MCU 110.

Figure 7:
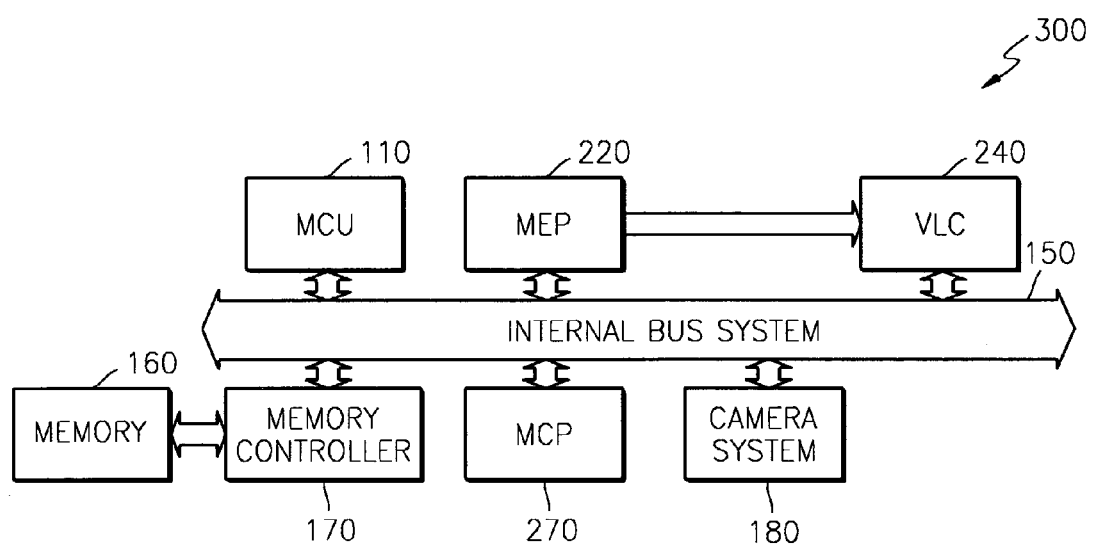
FIG. 7 is a block diagram of a video encoder according to another embodiment of the present invention.

FIG. 7 is a block diagram of a video encoder 300 according to another embodiment of the present invention. The video encoder 300 comprises an MCU 110, an MEP 220, a VLC 240, an internal bus system 150, a memory 160, a memory controller 170, an MCP 270, and a camera system 180.

Figure 8:
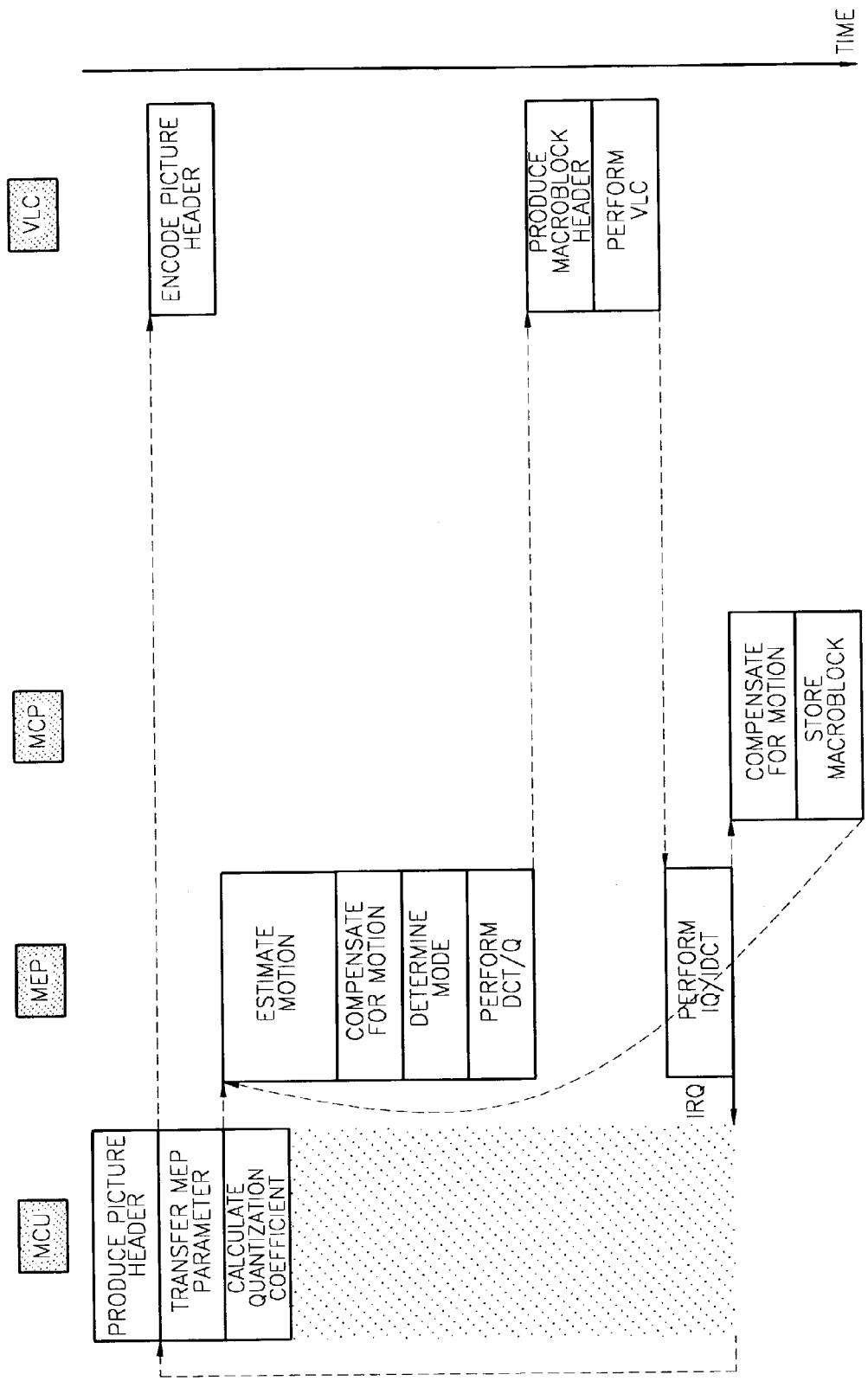
FIG. 8 is a flowchart illustrating an image encoding method according to another aspect of the invention, which is preferably performed in the video encoder of FIG. 7.

Referring to FIGS. 7 and 8, a video encoding method according to another aspect of the present invention, which is preferably performed in the video encoder 300, will be described. To begin, when a video frame to be encoded is prepared, the MCU 110 starts encoding while producing a picture header for the video or image frame to be encoded. The MCU 110 transfers the picture header to the VLC 240 via the internal bus system 150. The VLC 240 performs variable length coding (VLC) on the picture header and outputs the result to the memory 160.

The MCU 110 transfers an MEP parameter to the MEP 220. The MEP parameter includes an address of the first macroblock in a current frame, an address of a search area in its previous frame, the search area corresponding to a current macroblock in the current frame, and a number of macroblocks constituting a slice.

After transferring the MEP parameter to the MEP 220, the MCU 110 performs several operations including quantization coefficient calculation until a slice is encoded and decoded.

The MEP 220 estimates a motion vector in response to the MEP parameter and determines whether a current macroblock is to be processed in an intermode or an intramode.

The MEP 220 prepares data required for DCT and quantization depending on the data regarding the determined mode. If the current macroblock is processed in an intermode, the MEP 220 calculates the difference between the current macroblock and a motion-compensated macroblock, DCT transforms and quantizes the difference, and outputs a quantized DCT coefficient to the VLC 240. The MEP 220 also produces a CBP based on the quantized DCT coefficient and outputs the CBP to the VLC 240.

The MEP 220 can calculate the difference between the motion vector of the current macroblock and a predicted motion vector by a motion vector prediction method used in international standards such as H.263 or MPEG4.

On the other hand, if the current macroblock is processed in an intramode, the MEP 220 DCT transforms and quantizes the current macroblock and outputs a quantized DCT coefficient to the VLC 240.

The MEP 220 also produces an interrupt signal IRQ for indicating the point in time when encoding for a slice has been completed, and outputs the same to the MCU 110.

The VLC 240 receives the data regarding the determined mode, the CBP, and the quantized DCT coefficient from the MEP 220, produces a macroblock header using the received data, and outputs the same to the memory 160.

The VLC 240 also VLC-encodes the quantized DCT coefficient and outputs the encoding result to the memory 160. The memory 160 successively stores the VLC-coded macroblock header and the VLC-coded quantized DCT coefficient.

After VLC encoding on the quantized DCT coefficient is completed, the MEP 220 performs IQ and IDCT on the quantized DCT coefficient. In an intramode, the MEP 220 outputs the decoded original macroblock to the memory 160 without any intervening process. However, in an intermode, after the IQ and IDCT performed on the quantized DCT coefficient by the MEP 220, the MCP 270 adds the motion-compensated macroblock to the IQ-quantized macroblock to obtain the decoded original macroblock and outputs the decoded original macroblock to the memory 160.

As described above, when encoding and decoding for one macroblock in a slice is completed, its adjacent macroblock within the same slice is subsequently encoded and decoded.

Figure 9:
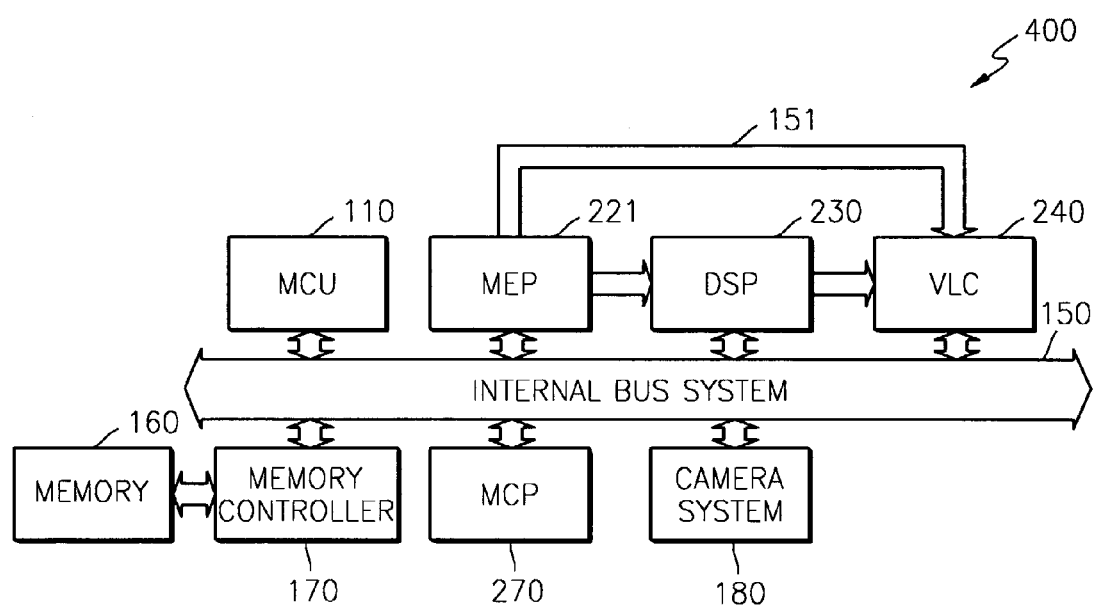
FIG. 9 is a block diagram of a video encoder according to another embodiment of the present invention.

FIG. 9 is a block diagram of a video encoder 400 according to another embodiment of the present invention. The video encoder 400 comprises an MCU 110, an MEP 221, a digital signal processor 230, a VLC 240, an internal bus system 150, a memory 160, a memory controller 170, an MCP 270, and a camera system 180. In addition, the MEP 221 is directly connected to the VLC 240 by a dedicated bus 151.

FIG. 10 is a flowchart illustrating an image encoding method according to another aspect of the invention, which is preferably performed in the video encoder 400 of FIG. 9. Referring to FIGS. 9 and 10, process steps of a mode of operation of the video encoder 400 will be described in chronological order. To begin, when a video frame to be encoded is prepared, the MCU 110 starts encoding while producing a picture header for the video frame. The MCU 110 transfers the picture header to the VLC 240 via the internal bus system 150.

The VLC 240 VLC encodes the received picture header and outputs the result to the memory 160. The memory 160 receives and stores the output signal of the VLC 240.

The MCU 110 transfers an MEP parameter to the MEP 221. The MEP parameter includes an address of the first macroblock of a slice, an address of a search area on a previous frame, the search area corresponding to the current macroblock of the current frame, and a number of macroblocks constituting a slice.

After transferring the MEP parameter to the MEP 221, the MCU 110 performs several operations including quantization coefficient calculation until a slice is encoded and decoded.

The MEP 221 estimates a motion vector in response to the MEP parameter and determines whether a current macroblock is to be processed in an intermode or an intramode. Data regarding the determined mode is transferred directly to the VLC 240 via the bus 151.

Depending on the data regarding the determined mode, the MEP 221 prepares data required for discrete cosine transformation (DCT) and quantization. If the current macroblock is processed in an intermode, the MEP 221 calculates the difference between the motion vector of the current macroblock and a predicted motion vector using a motion vector prediction method used in international standards such as H.263 or MPEG4 and outputs the same directly to the VLC 240 via the bus 151.

On the other hand, if the current macroblock is processed in an intramode, the MEP 221 outputs the current macroblock directly to the DSP 230. The MEP 221 generates an interrupt signal IRQ that indicates the point in time when encoding for a slice has been completed, and outputs the interrupt signal IRQ to the MCU 110.

The DSP 230 receives the current macroblock or the difference between the current macroblock and a motion-compensated macroblock, DCT-transforms and quantizes them, and outputs a quantized DCT coefficient to the VLC 240. The DSP 230 also produces a CBP based on the produced quantized DCT coefficient and outputs the same to the VLC 240.

The VLC 240 receives the mode data, the CBP, and the quantized DCT coefficient from the MEP 221, produces a macroblock header using the received data, and outputs the macroblock header to the memory 160. The VLC 240 also VLC-encodes the quantized DCT coefficient and outputs the encoding result to the memory 160.

After VLC encoding on the quantized DCT coefficient is completed, the MEP 221 performs IQ and IDCT on the quantized DCT coefficient. In an intramode, the MEP 221 outputs the decoded original macroblock to the memory 160 without any intervening process. However, in an intermode, the MEP 221 obtains the decoded original macroblock by adding the motion-compensated macroblock to the IQ-quantized macroblock and then outputs the decoded original macroblock to the memory 160.

As described above, when encoding and decoding for one macroblock in a slice is completed, its adjacent macroblock within the same slice is subsequently encoded and decoded.

Accordingly, each of the video encoders 100, 200, 300, and 400 according to the present invention generates an interrupt signal IRQ once for each slice. Consequently, in order to process 30 frames (each frame is 352×288 pixels) per second, each of the video encoders 100, 200, 300, and 400 generates the interrupt signal IRQ 540 times (540=288× 30/16) per second.

Accordingly, the frequency of generations of IRQ by each of the video encoders 100, 200, 300, and 400 according to the present invention is reduced to a maximum of one sixty-sixth ($\frac{1}{66}$) of the frequency at which IRQ signals are generated by the conventional video encoder 10. Therefore, the burden upon the MCU 110 to process the interrupt signal IRQ is reduced, leading to an improvement in the entire system of each of the video encoders 100, 200, 300, and 400.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A video encoding method, comprising the steps of:
   outputting a parameter for a slice of a current frame, wherein the slice comprises a plurality of macroblocks, wherein the parameter comprises an address of a first macroblock of the slice, an address of a search area in a previous frame, the search area corresponding to a current macroblock in a current frame, and a number of macroblocks comprising the slice;
   processing the slice by consecutively encoding and decoding each macroblock of the slice in response to the parameter; and
   outputting an interrupt signal for the slice.

2. The video encoding method of claim 1, wherein the interrupt signal indicates a point in time when encoding and decoding of each macroblock of the slice has been completed.

3. The video encoding method of claim 1, wherein the step of processing the slice comprises the steps of:
   estimating a motion vector in response to the parameter;
   determining whether a current macroblock of the slice is to be processed in an intermode or intramode;
   producing data required for discrete cosine transform (DCT) and quantization depending on a determined mode, DCT transforming and quantizing the produced data, and outputting a quantized coefficient;
   performing variable length coding (VLC) on the quantized coefficient; and
   performing inverse DCT (IDCT) and inverse quantization (IQ) on the quantized coefficient and decoding the current macroblock in the determined mode.

4. The video encoding method of claim 1, wherein the step of processing the slice comprises the steps of:
  estimating a motion vector in response to the parameter;
  determining whether the macroblocks comprising the slice are to be processed in an intermode or intramode; and
  calculating a difference between the macroblocks and motion-compensated macroblocks, DCT transforming and quantizing the difference, and forming a quantized coefficient and a coded block pattern based on the quantized coefficient, if it is determined that the macroblocks are to be processed in an intermode, and DCT transforming and quantizing the macroblocks and forming a quantized coefficient and a coded block pattern based on the quantized coefficient, if it is determined that the macroblocks are to be processed in an intramode.

5. The video encoding method of claim 4, wherein the step of processing the slice further comprises producing headers for the macroblocks in response to the determined mode, the coded block pattern, and the quantized coefficient and VLC coding the quantized coefficient.

6. The video encoding method of claim 4, further comprising the steps of IDCT transforming and IQ quantizing the quantized coefficient and decoding the macroblocks in the determined mode.

7. A video encoder, comprising:
  a main control unit for outputting a parameter for a slice of a current frame, wherein the slice comprise a plurality of macroblocks, wherein the parameter comprises an address of a first macroblock of the slice, an address of a search area in a previous frame, the search area corresponding to a current macroblock in a current frame, and a number of macroblocks of the slice; and
  a motion estimator for consecutively encoding and decoding each macroblock of the slice in response to the parameter and outputting an interrupt signal to the main control unit when the encoding and decoding for the slice is complete.

8. The video encoder of claim 7, wherein the motion estimator estimates a motion vector in response to the parameter, determines whether a current macroblock of the slice is to be processed in an intermode or intramode, produces data required for DCT and quantization depending on a determined mode, DCT transforms and quantizes the produced data, and outputs a quantized coefficient.

9. The video encoder of claim 8, further comprising a variable length coder, wherein the variable length coder receives and VLC-codes the quantized coefficient, and wherein when the VLC coding is completed, the motion estimator IDCT transforms and IQ quantizes the quantized coefficient and decodes the current macroblock in the determined mode.

10. The video encoder of claim 7, wherein the motion estimator estimates a motion vector in response to the parameter, determines whether the macroblocks comprising the slice are to be processed in an intermode or intramode, calculates a difference between the macroblocks and motion-compensated macroblocks, DCT transforms and quantizes the difference, and forms a quantized coefficient and a coded block pattern based on the quantized coefficient, if it is determined that the macroblocks are to be processed in an intermode, or DCT transforms and quantizes the macroblocks and forms a quantized coefficient and a coded block pattern based on the quantized coefficient, if it is determined that the macroblocks are to be processed in an intramode.

11. The video encoder of claim 10, further comprising a variable length coder, wherein the variable length coder produces headers for the macroblocks in response to the determined mode, the coded block pattern, and the difference between the macroblock and a motion-compensated macroblock, and wherein the variable length coder VLC-codes the quantized coefficient.

12. The video encoder of claim 11, wherein when the VLC-coding is completed, the motion estimator IDCT transforms and IQ quantizes the quantized coefficient and decodes the macroblocks in the determined mode.

13. The video encoder of claim 7, wherein the motion estimator estimates a motion vector in response to the parameter, determines whether a current macroblock of the slice is to be processed in an intermode or intramode, and produces data required for DCT and quantization depending on a determined mode.

14. The video encoder of claim 13, further comprising a quantization/inverse quantization circuit and a variable length coder, wherein the variable length coder receives and VLC-codes a quantized coefficient, and wherein the quantization/inverse quantization circuit DCT transforms and quantizes the produced data to obtain the quantized coefficient, or IQ quantizes and IDCT transforms the quantized coefficient when the VLC-coding is completed.

15. The video encoder of claim 14, wherein when the IQ and IDCT for the quantized coefficient are completed, the motion estimator decodes the current macroblock in the determined mode.

16. A video encoding method, comprising the steps of:
  outputting a parameter for a slice of a current frame, wherein the slice comprises a plurality of macroblocks;
  processing the slice by consecutively encoding and decoding each macroblock of the slice in response to the parameter; and
  outputting an interrupt signal when the encoding and decoding for the slice is complete, wherein the interrupt signal indicates a point in time when encoding and decoding of each macroblock of the slice has been completed.

* * * * *